United States Patent Office 3,561,031
Patented Feb. 9, 1971

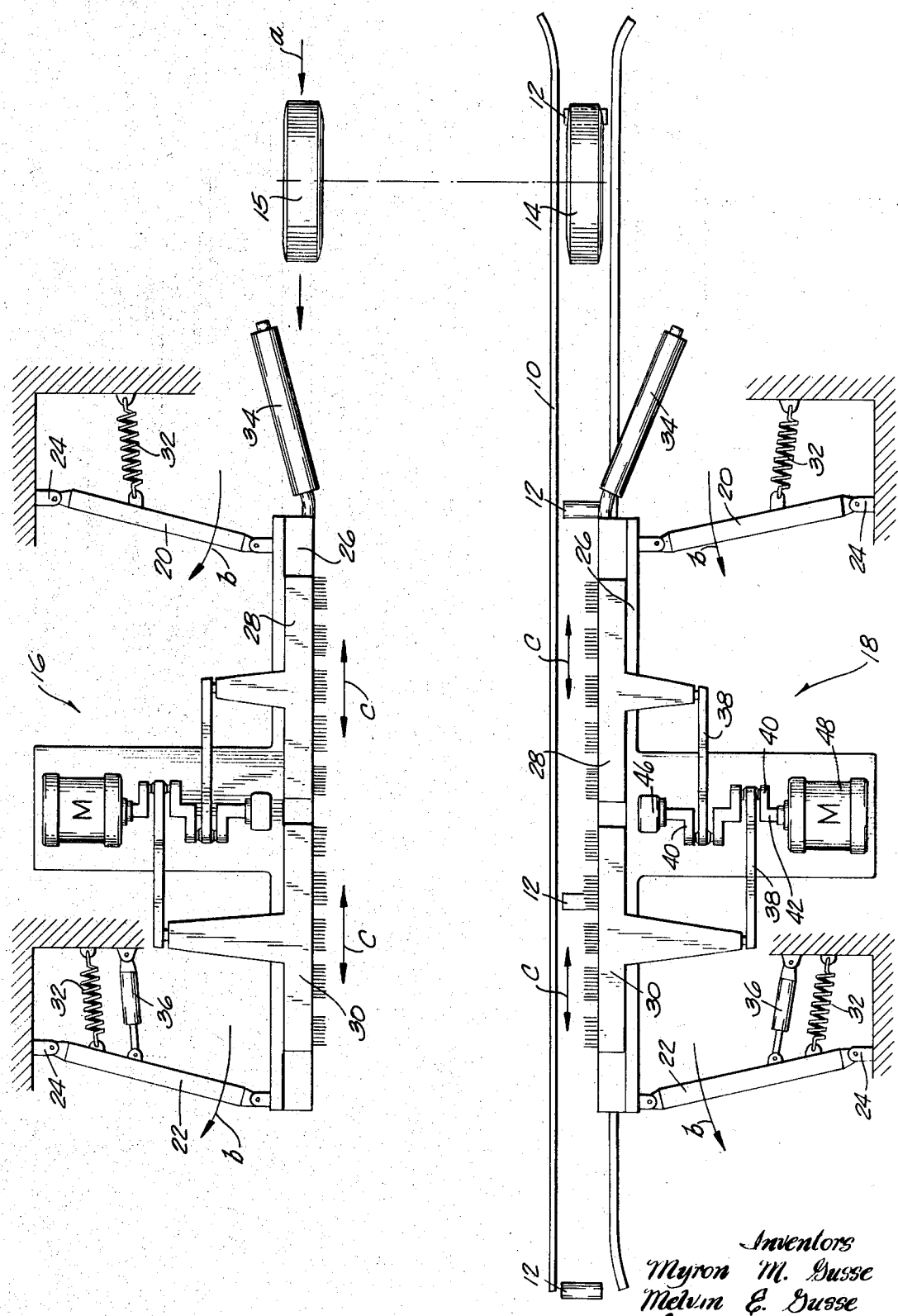

3,561,031
AUTOMOBILE TIRE WASHER
Myron M. Gusse, 353 17th St., and Melvin E. Gusse, Winnebago Heights, Malone, Rte. 1, both of Fond du Lac, Wis. 54935
Filed Apr. 29, 1969, Ser. No. 820,255
Int. Cl. B60s 3/04
U.S. Cl. 15—21                                                5 Claims

ABSTRACT OF THE DISCLOSURE

A tire washing mechanism adapted to wash the tires on one side of a vehicle as it moves past the mechanism. The mechanism is a spring biased and horizontally disposed parallelogram linkage, the cross-member of which is parallel to the intended path of the vehicle and which carries two sets of horizontally reciprocating brush assemblies. The linkage is moved upon being engaged by a tire while maintaining the brush assemblies parallel to the intended vehicle path. The movement of the brush assemblies is synchronized in order to balance their inertia forces and, thus, eliminate substantial force transmission to the linkage.

BACKGROUND OF INVENTION (I) Field of invention

The field of invention may be defined as brushing machines for use in washing tires in a car wash installation.

(II) Description of the prior art

Prior to the present invention almost all commercially successful car wash installations employed rotating brushes which were pressed against the side surface of the tire. In most cases the wheel on which the tire was to be washed was rotated with the car remaining stationary so that the rotating brush could cover the entire surface of the tire. In some instances a bank of rotating brushes has been suggested, with the bank being of sufficient length to permit each portion of the tire to come into contact with one or more of the brushes as the car passes the tire washing station. Horizontally reciprocating brushes have not been successfully commercially employed prior to this invention.

The principal object of the present invention is to provide a tire washing mechanism which can be installed in a tire wash station and will be capable of accommodating vehicles of various widths as well as of performing suitable washing without requiring the vehicle to be stopped at the tire wash station.

To attain this object the tire washing mechanism employs a spring biased parallelogram linkage which carries reciprocating horizontally disposed brush assemblies on its cross-member which is parallel to and projects into the intended path of the vehicle tire. Upon engagement by the tire, the linkage is moved in opposition to its spring bias to a position in which the brushes engage the outside surface of the tire. The support member and brush assemblies are maintained parallel to the tire path throughout the movement of the linkage. The brush assemblies are sufficiently long so that upon their movement the entire tire is washed as it rotates in moving through the washing station.

In order to permit the use of a spring biased linkage, the movement of the brush assemblies must not create significant vibratory or shock forces which could be transferred to the spring biased linkage, and, thus, cause undesirable vibration of the entire mechanism. Such undesirable vibration is avoided by utilizing two brush assemblies of substantially equal mass and by simultaneously moving both outwardly and thereafter inwardly and thereby balancing the inertia forces of the assemblies during their reciprocal movement.

DESCRIPTION OF THE DRAWING

The drawing shows a top plan view of a tire washing station within a car wash installation having righthand and lefthand tire wash mechanisms embodying the present invention, with some of the elements being shown in a diagrammatic form to better illustrate the concept of the present invention.

DESCRIPTION OF THE PREFERRED EMBODIMENT

The tire washing station shown in the drawing is installed in a typical car wash installation which is provided with a guide track 10 and a roller conveyor 12 for engagement with and guidance of the left front and rear tires (front tire 14 only being shown) of the vehicle. No track is provided for the righthand tires 15 of the vehicle which travel on the floor of the installation along a path which is dictated by the particular width of the vehicle. For this reason the car wash installation is capable of handling vehicles of various widths.

The tire washing station is provided with oppositely positioned tire washing mechanisms 16 and 18, which are identical in concept and in component parts and which wash the righthand and the lefthand tires of the vehicle, respectively, as the same are moved through the station. The corresponding component parts of each mechanism are identified by identical reference numerals.

Each tire wash mechanism is comprised of a horizontally disposed parallelogram linkage having two equal length guiding links 20, 22 which are connected to fixed vertical pivots 24 at their outer ends. The links are pivotally connected to a cross-member 26 which serves as a support and a guide for brush assemblies 28, 30 which are mounted for horizontal reciprocal sliding motion on the cross-member.

Each parallelogram linkage is biased by springs 32 to a position in which the brush assemblies project into or past the intended path of the tire to be washed. Upon advancement of the vehicle the tires will engage the horizontally slanted rollers 34 of the cross-members 26 and, upon further advancement, will cause the parallelogram linkage to move along the path indicated by arrows b. The linkages will be moved against the bias of springs 32 until the faces of the brush assemblies will be engaged with the outer tire sidewall. Because of the equal length and parallel relationship of links 20 and 22, the cross-members 26 and the faces of the brush assemblies will remain parallel to the intended path of the vehicle tires. The brushes will remain pressed against the tire sidewall until the tire has passed the installation at which point the linkages will be returned by the springs 32 to their original position as shown in the drawing. Shock absorbers 36 are provided to damp the movement of the linkage.

The brush assemblies 28 and 30 are mounted by suitable antifriction means on the cross-member 26 and are of substantially equal mass. Both assemblies are connected by connecting rods 38 to opposite and equal length crank arms 40 of a crankshaft 42. The latter is mounted in a suitable bearing block 46 and is rotated by a motor 48. Energization of the motor will impart reciprocal lineal movement to the brush assemblies along the path indicated by arrows c. The movement of the assemblies is synchronized and both will simultaneously move outwardly and at the same velocity from the position shown in the drawings upon a 180° rotation of the crankshaft and thereafter move simultaneously and at equal velocity inwardly to the original position upon further 180° rotation of the crank. Because of the substantially equal mass of the assemblies and because of the described synchronous movement, the inertia forces which are exerted by each assembly at the inner and outer ends of their stroke are equal and opposite in direction and, thus, balance themselves without exerting any substantial forces on the spring biased parallelogram linkage.

Although but a single embodiment of the present invention has been illustrated and described, it will be apparent to those skilled in the art that various changes and modifications may be made therein without departing from the spirit of the invention or from the scope of the appended claims.

We claim:

1. A tire washing mechanism comprising:
    a support member having an axis which extends generally longitudinally in a direction generally parallel to the path of a vehicle tire past the mechanism;
    guiding means permitting said member to move in a direction towards and away from such path while remaining generally parallel thereto;
    a plurality of brush assemblies slidably mounted on said support member for reciprocal back and forth motion along the axis of said support member;
    spring means normally biasing said support member to a position in which said brush assemblies extend past the intended tire path, and opposing said support members' motion away from said path;
    motor means imparting sliding motion to said brush assemblies with one half of said assemblies being moved towards one end of said support member and the other half of said brush assemblies being simultaneously moved at substantially the same velocity towards the other end of said support member and with all of said assemblies being thereafter moved simultaneously towards the center of said support member to thereby create a reciprocating scrubbing action; and
    tire engaging means adapted to engage a tire as it advances toward said brush assemblies and connected to said guide means to thereby move said support member and brush assemblies in opposition to said spring bias until, upon further advancement of the tire, the faces of said brush assemblies are in biased engagement with the sidewall of the tire.

2. A tire washing mechanism according to claim 1 wherein said guiding means is comprised of two generally parallel and equal length links which are pivotally connected at one of their ends to fixed pivots and are pivotally connected at their other ends to said support member to thereby permit said support member to remain parallel to the intended tire path as the support member is moved towards and away from such path.

3. A tire washing mechanism according to claim 2 wherein said motor means is connected to such support member for movement therewith.

4. A tire washing mechanism according to claim 3 including damping means which damp the motion of said support member.

5. A tire washing mechanism according to claim 4 wherein said tire engaging means is comprised of a roller which is connected to said support member at the entrance end to the mechanism and wherein said roller is oblique to the intended tire path and so positioned as to engage the tire as it approaches the mechanism and, upon further advancement of the tire, to cause said support member to be moved towards the position in which said brush assemblies will engage the sidewalls of the tire.

References Cited

UNITED STATES PATENTS

| 2,822,564 | 2/1958 | Crivelli | 15—21(C3) |
| 2,910,202 | 10/1959 | Clark et al. | 15—21(O) |

EDWARD L. ROBERTS, Primary Examiner